(12) United States Patent
Islam

(10) Patent No.: US 8,463,293 B2
(45) Date of Patent: *Jun. 11, 2013

(54) SYSTEM AND METHOD FOR A HIGH THROUGHPUT GSM LOCATION SOLUTION

(75) Inventor: Tariqul Islam, Germantown, MD (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,182

(22) Filed: Sep. 11, 2012

(65) Prior Publication Data

US 2013/0072231 A1    Mar. 21, 2013

Related U.S. Application Data

(63) Continuation of application No. 12/563,590, filed on Sep. 21, 2009, now Pat. No. 8,340,683.

(51) Int. Cl.
*H04W 24/00* (2009.01)

(52) U.S. Cl.
USPC ............. 455/456.2; 455/456.1; 455/501; 455/67.11; 455/67.13; 455/440

(58) Field of Classification Search
USPC ............ 455/456.1, 501, 67.11, 67.13, 440, 455/456.2, 67.1
See application file for complete search history.

(56) References Cited

U.S. PATENT DOCUMENTS

| | | | |
|---|---|---|---|
| 4,728,959 A | 3/1988 | Maloney | |
| 5,251,233 A * | 10/1993 | Labedz et al. | 375/230 |
| 5,327,144 A | 7/1994 | Stilp et al. | |
| 5,608,410 A | 3/1997 | Stilp et al. | |
| 5,717,713 A * | 2/1998 | Natali | 375/149 |
| 5,883,929 A | 3/1999 | Wang et al. | |
| 5,959,580 A | 9/1999 | Maloney et al. | |
| 6,009,334 A | 12/1999 | Grubeck et al. | |
| 6,031,490 A | 2/2000 | Forssen et al. | |
| 6,047,192 A | 4/2000 | Maloney | |
| 6,091,362 A | 7/2000 | Stilp | |

(Continued)

FOREIGN PATENT DOCUMENTS

WO    2006088472 A1    8/2006

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

(Continued)

*Primary Examiner* — Joseph Arevalo
(74) *Attorney, Agent, or Firm* — Duane Morris LLP

(57) ABSTRACT

A system and method for estimating a location of wireless devices transmitting signals on channels in a communications system having a plurality of nodes and a plurality of Location Measurement Units ("LMU"). A first plurality of signals from a first channel may be received by one or more of the plural LMUs and a second plurality of signals from a second channel may be received by one or more of the plural LMUs. The received first and second plural signals may be converted into first and second digital signals and then divided into first and second sets of frequency bins, the first and second sets of bins corresponding to the respective channel. Each of the divided signals may be correlated with one or more reference signals, and the correlated signals stored in a database for estimating a location of one or more wireless devices.

13 Claims, 16 Drawing Sheets

U.S. PATENT DOCUMENTS

| | | |
|---|---|---|
| 6,097,336 A | 8/2000 | Stilp |
| 6,097,709 A | 8/2000 | Kuwabara |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,172,644 B1 | 1/2001 | Stilp |
| 6,184,829 B1 | 2/2001 | Stilp |
| 6,266,013 B1 | 7/2001 | Stilp et al. |
| 6,269,246 B1 | 7/2001 | Rao et al. |
| 6,275,186 B1 | 8/2001 | Kong |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,454 B1 | 9/2001 | Havinis et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack et al. |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,449,486 B1 | 9/2002 | Rao |
| 6,463,290 B1 | 10/2002 | Stilp et al. |
| 6,483,460 B2 | 11/2002 | Stilp et al. |
| 6,492,944 B1 | 12/2002 | Stilp |
| 6,519,465 B2 | 2/2003 | Stilp et al. |
| 6,522,887 B2 | 2/2003 | Larsson et al. |
| 6,529,708 B1 | 3/2003 | Larsson et al. |
| 6,546,256 B1 | 4/2003 | Maloney |
| 6,563,460 B2 | 5/2003 | Stilp et al. |
| 6,591,112 B1 | 7/2003 | Siccardo et al. |
| 6,603,428 B2 | 8/2003 | Stilp |
| 6,646,604 B2 | 11/2003 | Anderson |
| 6,661,379 B2 | 12/2003 | Stilp et al. |
| 6,675,018 B2 | 1/2004 | Villier et al. |
| 6,687,507 B2 | 2/2004 | Fischer et al. |
| 6,765,531 B2 | 7/2004 | Anderson |
| 6,771,625 B1 | 8/2004 | Seal |
| 6,782,264 B2 | 8/2004 | Anderson |
| 6,782,265 B2 | 8/2004 | Perez-Breva et al. |
| 6,873,290 B2 | 3/2005 | Anderson et al. |
| 6,876,859 B2 | 4/2005 | Anderson et al. |
| 6,889,052 B2 | 5/2005 | Geier et al. |
| 6,917,290 B2 | 7/2005 | Land |
| 6,944,465 B2 | 9/2005 | Spain et al. |
| 6,996,392 B2 | 2/2006 | Anderson |
| 7,023,383 B2 | 4/2006 | Stilp et al. |
| 7,085,248 B1 | 8/2006 | Holma et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Anderson |
| 7,315,745 B2 | 1/2008 | Duffett-Smith et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,027,478 B2 | 9/2011 | Barry et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0160788 A1 | 10/2002 | Duffett-Smith et al. |
| 2002/0172223 A1 | 11/2002 | Stilp et al. |
| 2003/0064734 A1 | 4/2003 | Stilp et al. |
| 2004/0075562 A1* | 4/2004 | Land .................. 340/573.4 |
| 2004/0203539 A1 | 10/2004 | Benes et al. |
| 2006/0003775 A1 | 1/2006 | Bull et al. |
| 2006/0030333 A1 | 2/2006 | Ward et al. |
| 2006/0093048 A9 | 5/2006 | Taleb |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |
| 2009/0060207 A1 | 3/2009 | Barry et al. |
| 2010/0039326 A1 | 2/2010 | Lefever et al. |
| 2010/0309969 A1* | 12/2010 | Kim et al. ................ 375/232 |
| 2010/0310015 A1* | 12/2010 | Choi et al. ................ 375/340 |

OTHER PUBLICATIONS

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Nabil R. Yousef; "Robust Wireless Location Over Fading Channels"; Transactions on Vehicular Technology; vol. 52; No. 1.; Jan. 2003; pp. 117-126.

* cited by examiner

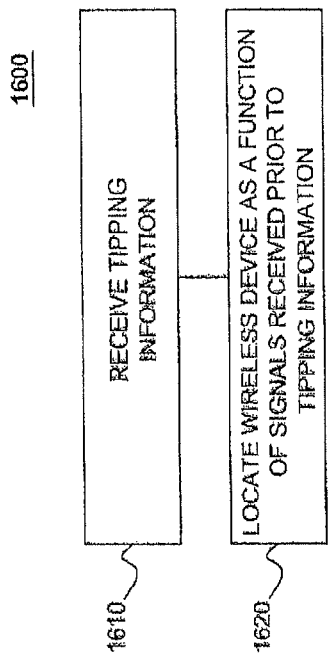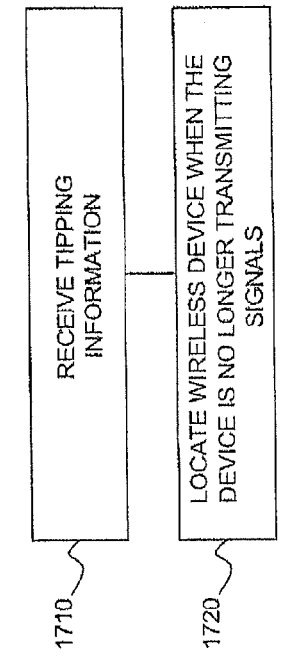

SYSTEM AND METHOD FOR A HIGH THROUGHPUT GSM LOCATION SOLUTION

BACKGROUND

The instant application claims the priority benefit of U.S. application Ser. No. 12/563,590 filed 21 Sep. 2009, entitled "System and Method for a High Throughput GSM Location Solution", the entirety of which is hereby incorporated herein by reference.

The use of wireless communication devices such as telephones, pagers, personal digital assistants, laptop computers, etc., hereinafter referred to collectively as mobile devices, mobile appliances or wireless devices, has become prevalent in today's society. At the urging of public safety groups, there is an interest in technology which can determine the geographic position or "geo-location" of a mobile appliance in certain circumstances. For example, the Federal Communication Commission ("FCC") issued a geo-location mandate for providers of wireless telephone communication services that puts in place a schedule and an accuracy standard under which the providers of wireless communications must implement geo-location technology for wireless telephones when used to make a 911 emergency ("E911") telephone call.

In addition to E911 emergency related issues, wireless telecommunications providers are developing location-enabled services for their subscribers including roadside assistance, turn-by-turn driving directions, concierge services, location-specific billing rates and location-specific advertising. To support FCC E911 rules to locate wireless 911 callers, as well as the location-enabled services, the providers of wireless communication services are installing mobile appliance location capabilities into their networks. In operation, these network overlay location systems take measurements on radio frequency ("RF") transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations may include, but are not limited to, time difference of arrival ("TDOA"), time of arrival ("TOA"), angle of arrival ("AOA"), signal power, unique/repeatable radio propagation path (radio fingerprinting) derivable features, etc. In addition, geo-location systems may also use collateral information, e.g., information other than that derived for the RF measurement to assist in the geo-location of the mobile appliance, for example, location of roads, dead-reckoning, topography, map matching, etc.

In a network-based geo-location system, the mobile appliance to be located is typically identified and radio channel assignments determined by (a) monitoring the control information transmitted on a radio channel or wireline interface that is part of the wireless communication system for telephone calls being placed by the mobile appliance to detect calls of interest, e.g., 911 calls, (b) a location request provided by a non-mobile appliance source, e.g., an enhanced services provider. Once a mobile appliance to be located has been identified and radio channel assignments determined, the location determining system is first tasked to determine the geo-location of the mobile appliance. Then the location determining system may be directed to report the determined position to a requesting entity or enhanced services provider.

The monitoring of RF transmissions from the mobile appliance or wireline interfaces containing call setup or channel assignment information to identify calls of interest is known as "tipping" and generally involves recognizing a call of interest being made from a mobile appliance and collecting the call setup information. Once the mobile appliance is identified and the call setup information collected, the location determining system can be tasked to geo-locate the mobile appliance.

FIG. 1 is a block diagram of a typical geo-location process 100. In the normal course of operation, a Geolocation Control Station ("GCS") may be tasked by an outside entity to generate a location estimate on a particular mobile appliance in block 110. The tasking typically is accompanied by information on the mobile of interest which may include the serving base station and sector for the call and the RF channel (frequency, time slot, Code Division Multiple Access ("CDMA") code, etc.) being used by the wireless communications network to complete the wireless connection. Once the GCS receives this tasking, it may task Location Measurement Units ("LMU") proximate to the serving sector or serving base station to detect the signal from the target mobile appliance in block 120. The LMUs may determine measurements on the RF emissions of the mobile appliance's signal, as indicated by block 130. The LMUs may then report the measurements to the GCS. The GCS then computes a location estimate typically using some mathematical or data matching algorithm, as represented in block 140, and reports the estimated location to the requesting entity, as indicated in block 150. Control channels/information on either RF or wireline links may also be utilized to set up calls in the wireless network can be scanned to detect the placement of a call of interest. The signaling that occurs on the control channel may be used to determine location. Further, RF traffic channel parameters may be extracted from the control channel messaging to determine which traffic channel to use for location related measurements.

Network overly location systems typically locate a mobile appliance on the traffic channels of a wireless network using sensors employing various techniques of TDOA, AOA, TOA and other techniques. Geo-location systems, when not being tasked to locate a mobile appliance for emergency or other location-based services, are effectively in an idle mode. The tasking duty cycle may vary depending on what uses are being made of the location data. For E911 purposes, the effective utilization of the location network is low. With other location enabled value added services, the use may be higher, depending upon the service. For example, a service providing turn-by-turn instructions to a motorist would likely be higher than a service that provides road side assistance.

Typical location processes may commence after receipt of tipping information. Samples are generally collected according to the tipping information and then data bits are demodulated at a primary site and sent to the secondary sites through the GCS. This process occurs over the course of several seconds and the collection of data and exchange of demodulated bits incur a large overhead in this typical geo-location process. The performance of any correlation is relatively small in comparison to other overheads and the location process may be accelerated or improved if the collection time is reduced and the exchange of demodulated bits eliminated.

Thus, there is a need in the art to overcome the limitations of the prior art and provide a novel system and method for a high throughput GSM location solution. It is therefore an object of embodiments of the present subject matter to provide a locator system capable of locating tens of mobile calls per second and/or locate mobile devices, active or otherwise, at any given instant.

One embodiment of the present subject matter provides a method for estimating a location of wireless devices transmitting signals on channels in a communications system having a plurality of nodes and a plurality of LMUs. The method may include receiving a first plurality of signals from a first channel by one or more of the plural LMUs and receiving a second plurality of signals from a second channel by one or more of the plural LMUs. The received first and second plural signals may be converted into first and second digital signals and divided into first and second sets of frequency bins, the first and second sets of bins corresponding to the respective channel. Each of the divided signals may be correlated with one or more reference signals and stored in a database for estimating a location of one or more wireless devices.

Another embodiment of the present subject matter provides a method for estimating a location of a wireless device in a communication system having a plurality of nodes and a plurality of LMUs. Tipping information may be received by ones of the plural LMUs, the tipping information corresponding to the wireless device, and the wireless device may be located as a function of signals transmitted from the wireless device prior to receipt of the tipping information.

A further embodiment of the present subject matter provides a method for estimating a location of a wireless device transmitting signals on a channel in a communication system having a plurality of nodes and a plurality of LMUs. Tipping information may be received by ones of the plural LMUs, the tipping information corresponding to the wireless device, and the wireless device may be located as a function of the tipping information after the device is no longer transmitting signals.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIGS. 15-17 are block diagram of algorithms according to embodiments of the present subject matter.

DETAILED DESCRIPTION

With reference to the figures where like elements have been given like numerical designations to facilitate an understanding of the present subject matter, the various embodiments of a system and method for a high throughput GSM location solution are herein described.

Figure 1:
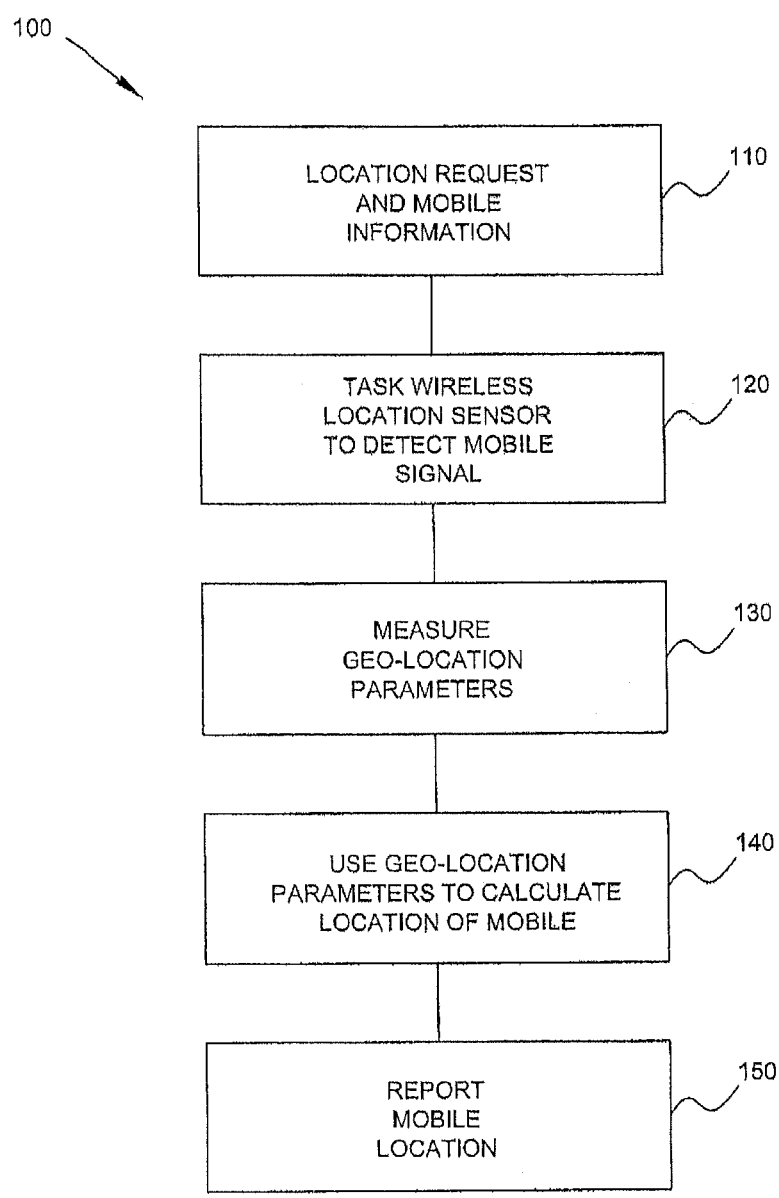
FIG. 1 is a block diagram of a typical geo-location process.
Figure 2:
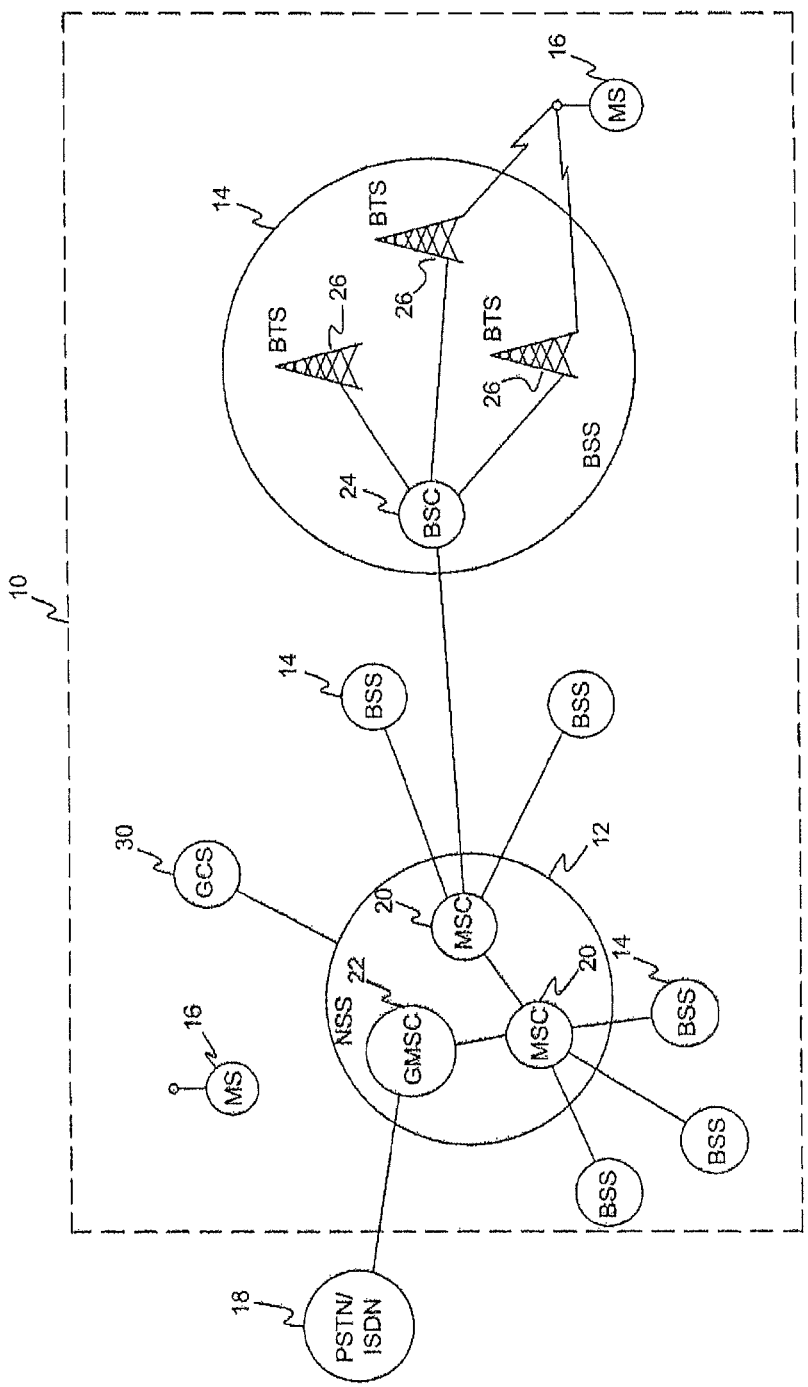
FIG. 2 is a system according to one embodiment of the present subject matter.

FIG. 2 is a system according to one embodiment of the present subject matter. With reference to FIG. 2, an exemplary Global System for Mobile communications ("GSM") network 10 may include a network and switching sub-system ("NSS") 12, connecting with plural base station subsystems ("BSS") 14. The BSSs 14 generally provide radio communication with mobile devices or stations ("MS") 16. The NSS 12 may communicate with a fixed public network 18, i.e., a public switched telephone network ("PSTN") and an integrated services digital network ("ISDN").

The NSS 12 may also include mobile switching centers ("MSC") 20 interconnected by dedicated connections or via the network 10. Some of the MSCs 20 may be gateway mobile switching centers ("GMSC") 22, which generally handle calls directed to MSs 16 from outside of the network 10. Each MSC 20 may be connected to one or more of the BSSs 14, and the interface between a BSS 14 and its MSC 20 is standardized. The network 10 may also include a Geolocation Control Station ("GCS") 30. The GCS 30 may, in some embodiments, be independent of the network 10.

Each BSS 14 may includes a base station controller ("BSC") 24 connected via an A interface to the MSC 20. The BSC 24 generally controls a plurality of base transceiver stations ("BTS") 26. Plural BTSs 26 may be located at each site and include radio transmitters and receivers for providing radio coverage of a local area or cell so that communication can be established with MSs 16 across a radio interface. BTSs 26 may also include co-located LMUs. Of course, these LMUs may be sparsely located within an exemplary network and may not be co-located with a respective BTS 26.

While the telecommunications network depicted in FIG. 2 may be implemented as a GSM-type network, those skilled in the art can appreciate that although the present invention is described and illustrated in the context of a GSM network standard, embodiments of the present subject matter may also be implemented in accordance with other standards and networks, including those utilized throughout North and South America, Europe, etc. Thus, the GSM network standard, as discussed herein, is merely presented for illustrative purposes only and is not a limiting feature of the present subject matter. Another refinement to wireless systems, whether GSM-based or otherwise, is the application of positioning technologies, such as Global Positioning Satellite ("GPS"). GPS is a well-known technology that has been utilized over several decades in many military and civilian applications. Thus, GPS is one of many possible positioning techniques that may be utilized in accordance with embodiments of the present subject matter. Other positioning techniques that may be utilized in accordance with embodiments of the present subject matter include, but are not limited to, TDOA, AOA, TOA, as well as any number of other geographical positioning techniques. Those skilled in the art will appreciate the present subject matter described herein is not limited for use with only one type of geographical positioning method.

As is known in the art, GSM normal bursts contain a 26 bit long reference signal or training sequence. Embodiments of the present subject matter may continuously correlate every slot of every frequency against all possible reference signals and store the correlation results in an exemplary database. Positioning information, such as but not limited to TOA, may be determined by looking up the stored results as soon as tipping information becomes available; thus, no additional collection time is required thereby resulting in low overhead in an exemplary network. Additionally, embodiments of the present subject matter may non-coherently add the stored correlation results of multiple transmitted slots to thereby boost detection gain and eliminate the necessity of exchanging the demodulated bits through the GCS. As estimating positioning information is a lookup operation in embodiments of the present subject matter, a multitude of calls per second may be located. Additionally, mobile appliances or devices may be located after a call is terminated thereby increasing the attractiveness of embodiments of the present subject matter for security applications.

An LMU according to an embodiment of the present subject matter may continuously correlate any or all GSM channels with any or all of the eight possible training sequences, may store the correlation results for a predetermined amount of time, and may effectively compute positioning information of all the transmissions in a network. When a mobile device needs to be located, an exemplary GSM network 10 may provide information about the most recent transmissions from that mobile device. For a mobile terminating-location request ("MT-LR") application, the network 10 may provide information regarding future transmissions. Exemplary network tipping information may include, but is not limited to, frequencies or channel numbers of a predetermined number of transmissions, e.g., the last few, of a mobile device, an approximate time of several, e.g., the last few, transmissions of a mobile device, training sequences utilized in several, e.g., the last few, transmissions of a mobile device, and combinations thereof.

Once tipping information is received by an exemplary LMU, the LMU may look up the matching correlation results stored in the memory, time align the slots and non-coherently add the correlation results. A peak and/or peak quality may be detected which may then be provided to the GCS. The GCS may then provide the positioning information to a positioning determining entity to produce a location fix of the mobile device.

One embodiment of the present subject matter may utilize a fast Fourier transform ("FFT") frequency channelization technique described in Digital Techniques for Wideband Receivers, James Tsui, 1995, the entirety of which is incorporated herein by reference. Those skilled in the art, however, will appreciate that the present subject matter described herein is not limited for use with only one technique. For example, a decimation technique may also be utilized with embodiments of the present subject matter, however, depending upon the digital signal processor ("DSP") employed in an embodiment, one technique may be more computationally efficient than another.

Figure 3:
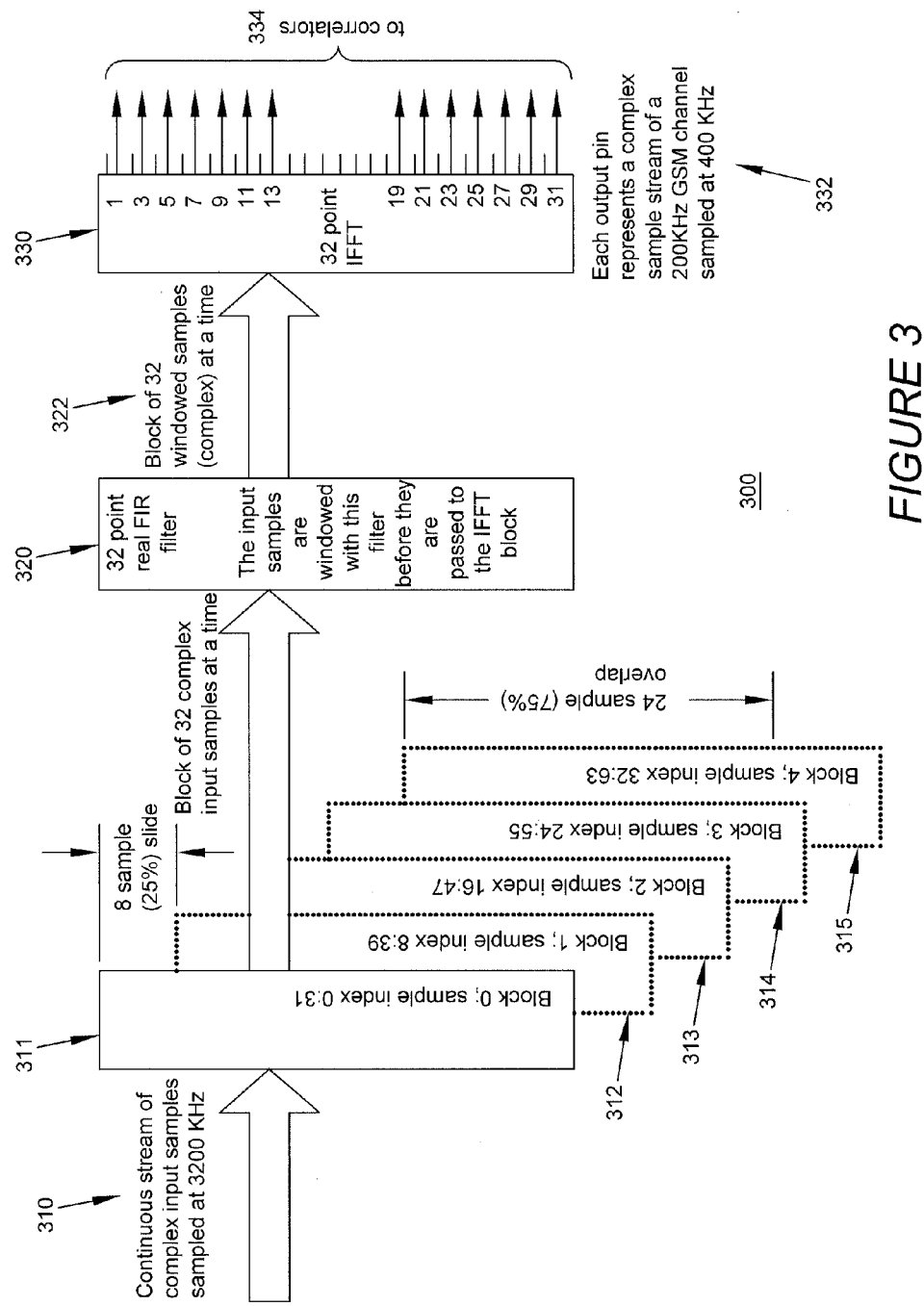
FIG. 3 is a high level overview of a frequency channelizer according to one embodiment of the present subject matter.

FIG. 3 is a high level overview of a frequency channelizer according to one embodiment of the present subject matter. With reference to FIG. 3, input data 310 to the frequency channelizer 300 may be sampled at a predetermined sample rate, such as, but not limited to, 3.2 MHz. Generally, the sample rate has an effect on the FFT size, frequency bin separation, overlapping rate of the Short Term Fourier Transform ("STFT"), and number of channels that the input signal may contain. Generally, if one antenna output is processed, 3.2 MHz may be a suitable sampling rate; if two antenna outputs are processed, 1.6 MHz may be a suitable sampling rate. Of course, these sampling rates are exemplary only and should not limit the scope of the claims appended herewith.

Figure 4:
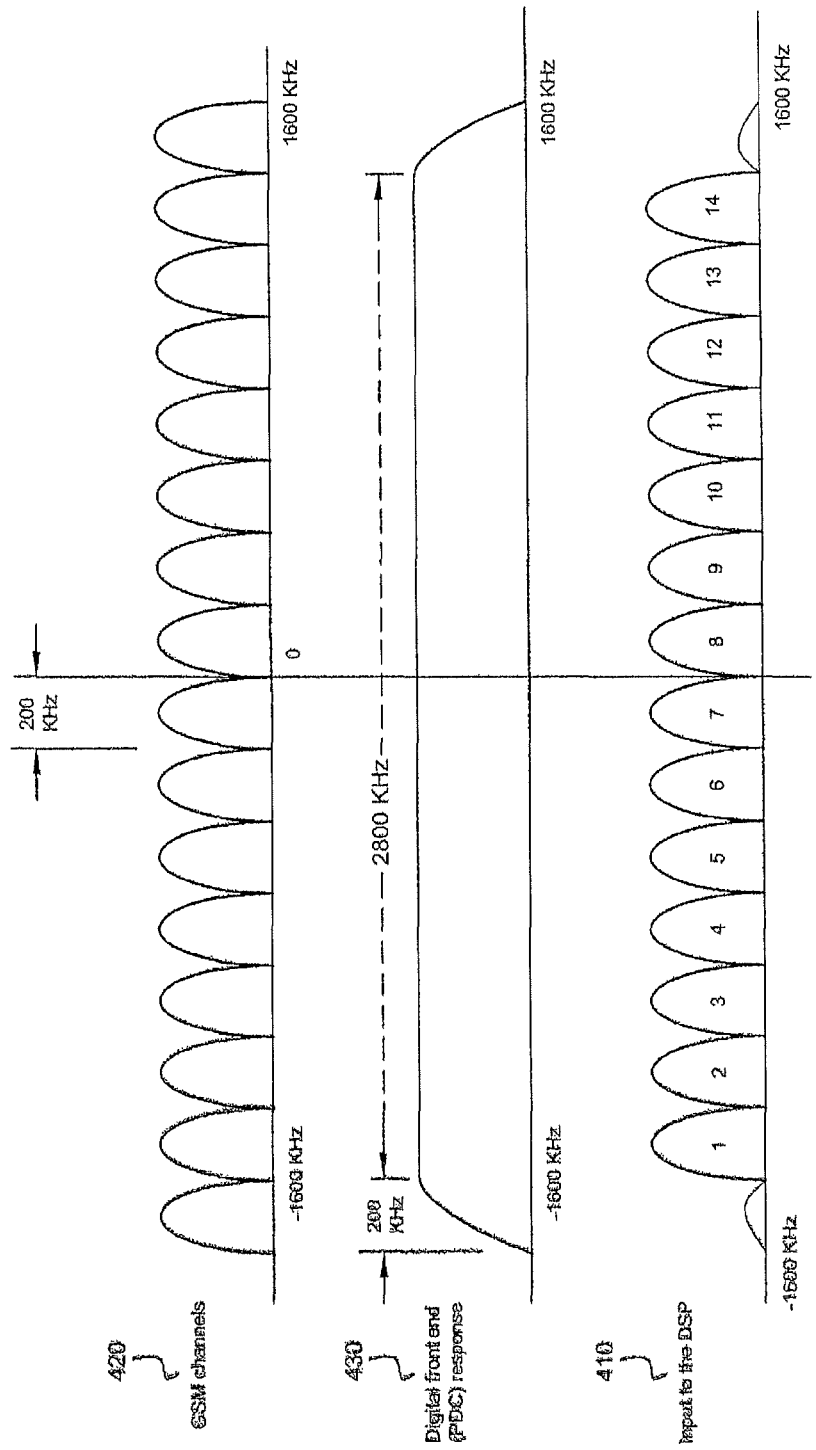
FIG. 4 is a diagram of an input stream to an exemplary frequency channelizer.

FIG. 4 is a diagram of an input stream to an exemplary frequency channelizer. With reference to FIG. 4, depending upon the sampling rate, in this example 3.2 MHz, an input signal 410 to a DSP may be aligned to capture a predetermined number of GSM channels 420. It should be noted, however, that the GSM channels 420 illustrated in FIG. 4 are only a few of the 125 available GSM channels. Generally, an RF front end and an IF section of an exemplary receiver may provide a baseband signal to exemplary circuitry of embodiments of the present subject matter, and the GSM channels 420 illustrated in FIG. 4 may thus be depicted as baseband signals. The Programmable Downconverter ("PDC") can be configured to align the spectrum of the input signal 410 to a DSP to capture, for example, fourteen GSM channels. The PDC may be viewed as a device having the illustrated frequency response 430 in FIG. 4. Therefore, when the signal 420 passes through the PDC, an output from the DSP has the spectrum shown in 410 which illustrates that a few (in this case fourteen) GSM channels may be preserved the remainder filtered out.

Figure 5:
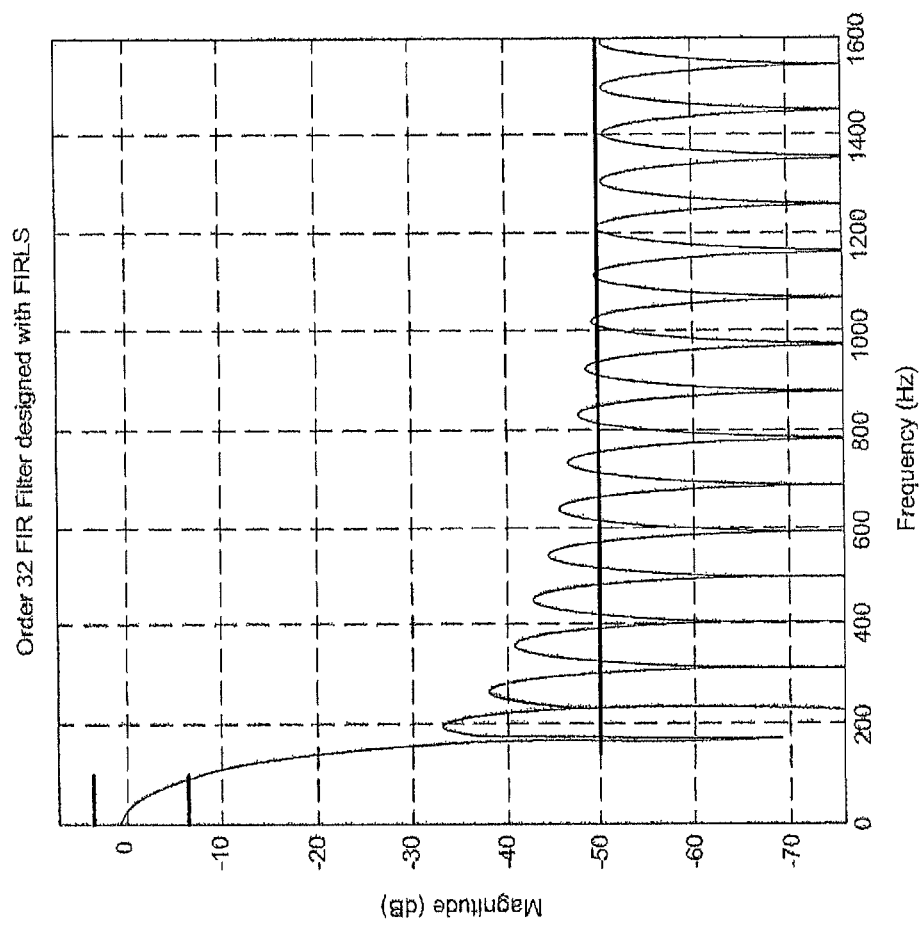
FIG. 5 is a diagram of a FIR window utilized in one embodiment of the present subject matter.
Figure 6:
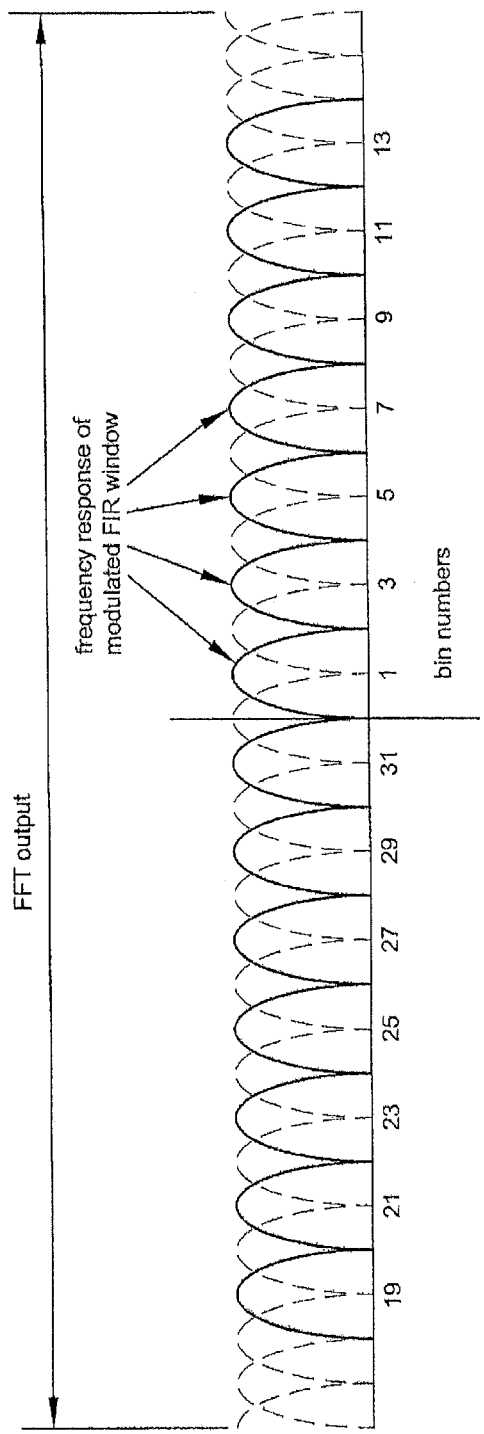
FIG. 6 is a diagram of an exemplary selection of GSM channels at an FFT output.

A block of thirty two input samples 311 may be windowed by a finite impulse response ("FIR") or other suitable filter 320. One suitable filter may be, but is not limited to, a 32-tap FIR filter. The thirty two windowed samples 322 may then be passed to an Inverse Fast Fourier Transform ("IFFT") block 330. The output of the IFFT block 330 at bins 1, 3, 5, 7, 9, 11, 13, 19, 21, 23, 25, 27, 29, and 31 may generally represent the sample streams of the 14 input GSM channels 410 depicted in FIG. 4. In this non-limiting embodiment, after the first thirty two input samples 311 are processed, a second block of input data 312 may be selected with, for example, a 75% overlap, meaning that the input block 312 may slide by 8 samples. Additional input blocks 313, 314, 315 and so on may be continuously processed accordingly. The frequency spacing of the FFT bins 332 may be 3200/32=100 KHz, and every other bin may align to a 200 KHz GSM channel. The output sample rate, due to 75% overlapping of the input signal, may be represented in this example as (3200/32)*(32/8)=400 KHz. FIGS. 5 and 6 generally illustrate how one exemplary frequency channelization technique may be implemented.

FIG. 5 is a diagram of a FIR window utilized in one embodiment of the present subject matter. With reference to FIG. 5, an exemplary 32-tap window may employ a frequency response that passes a single GSM channel at the baseband and stops all other channels. An optimum filter response may generally be determined by simulation, and the example of the window illustrated in FIG. 5 is exemplary only and was simulated utilizing a least square linear-phase FIR filter design. FIG. 6 is a diagram of an exemplary selection of GSM channels at the FFT output 332 which generally represents the sample streams of the 14 input GSM channels 410 depicted in FIG. 4. These outputs 332 may then be provided to one or more exemplary correlators 334.

Figure 7:
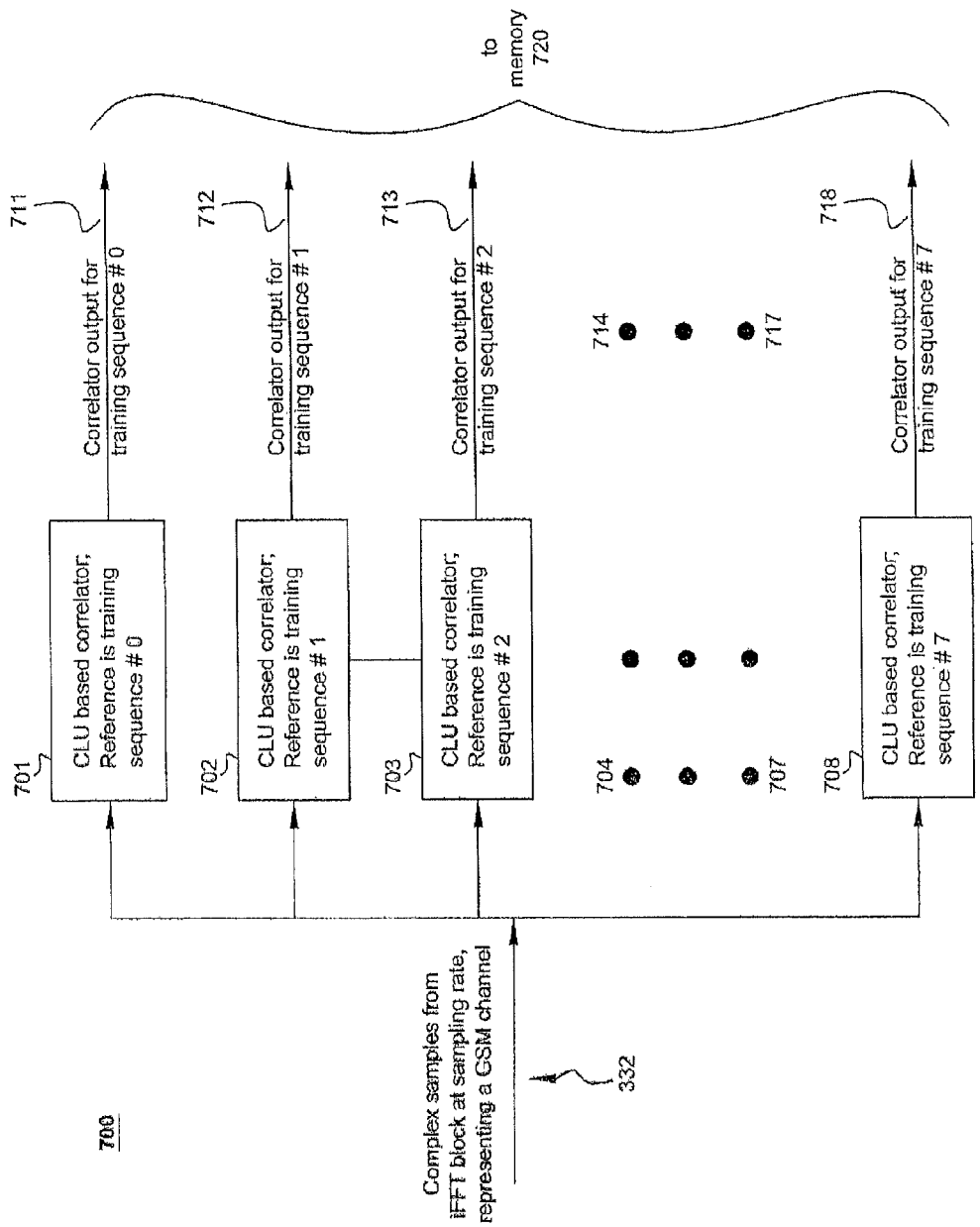
FIG. 7 is a diagram of a correlator bank according to an embodiment of the present subject matter.

FIG. 7 is a diagram of a correlator bank according to an embodiment of the present subject matter. With reference to FIG. 7, each of the channelized outputs 332 may be correlated with eight training sequences. An exemplary Communication Logic Unit ("CLU") of a DSP, e.g, TigerSHARC processor, may provide an efficient method of correlation. Of course, this exemplary DSP should not limit the scope of the claims appended herewith. In this exemplary CLU, a correlator bank

700 may comprise one or more correlators 701-708 processing data in 16-bit or 32-bit complex I/Q format. Complex samples 332 from the IFFT block 330 may be provided at a 400 KHz rate representing a 200 KHz channel. The CLU based correlator bank 700 may take, for example, input samples and correlate this with a 2-bit (one bit for each of the real and imaginary parts) reference signal (training sequence 0 through 7). This correlated output 711-718 may then be provided to a database 720 or other suitable memory. Simulation of one embodiment of the present subject matter showed that a 2-bit signal provided adequate correlation performance.

Figure 8:
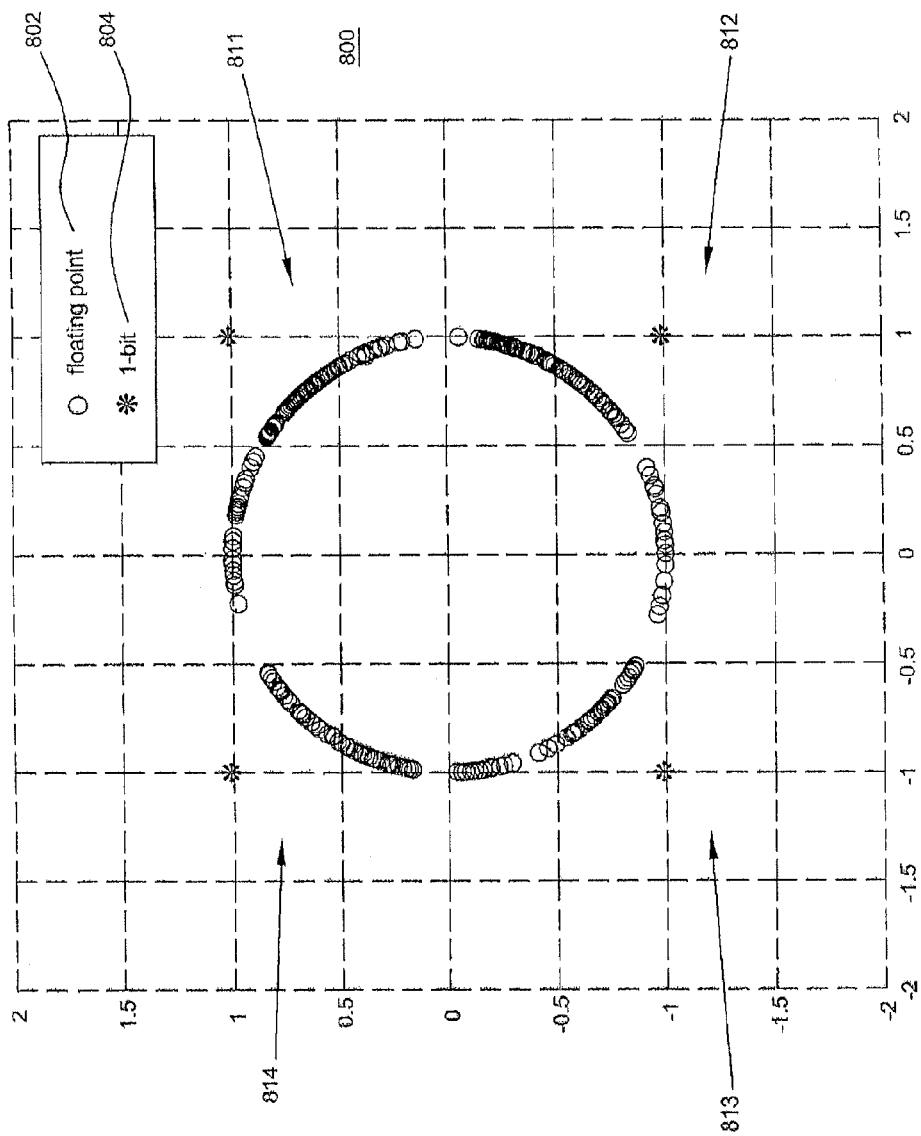
FIG. 8 is a diagram of a floating point and a 1-bit reference signal constellation.

FIG. 8 is a diagram of a floating point and 1-bit reference signal constellation. With reference to FIG. 8, a floating point 802 and 1-bit fixed point reference signal 804 constellation was plotted 800. High precision signal points in the first, second, third and fourth quadrants 811-814 map to the fixed point signal 1+j, −1+j, −1−j, and 1−j, respectively. A maximum phase error in the quantization processes may generally be $\pi/4$ with an average error much less than that considering that signal points tend to have higher density around $\pi/4$, $3\pi/4$, $5\pi/4$, and $7\pi/4$ angles.

Figure 9:
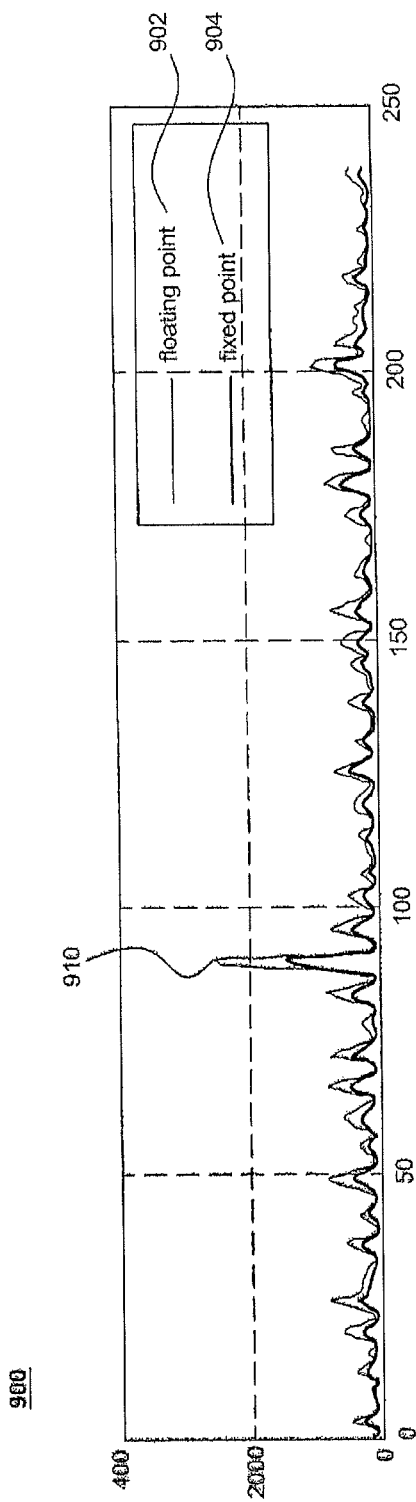
FIG. 9 is a diagram of a floating point and 1-bit reference signal correlation results.

FIG. 9 is a diagram of floating point and 1-bit reference signal correlation results. With reference to FIG. 9, an exemplary correlation output 900 for a floating point 902 and 1-bit fixed point 904 reference was simulated. A fixed point peak 910 appears higher because of scaling; however, the respective peak to average ratio or peak to standard ratio was actually lower than those of the floating point.

Figure 10:
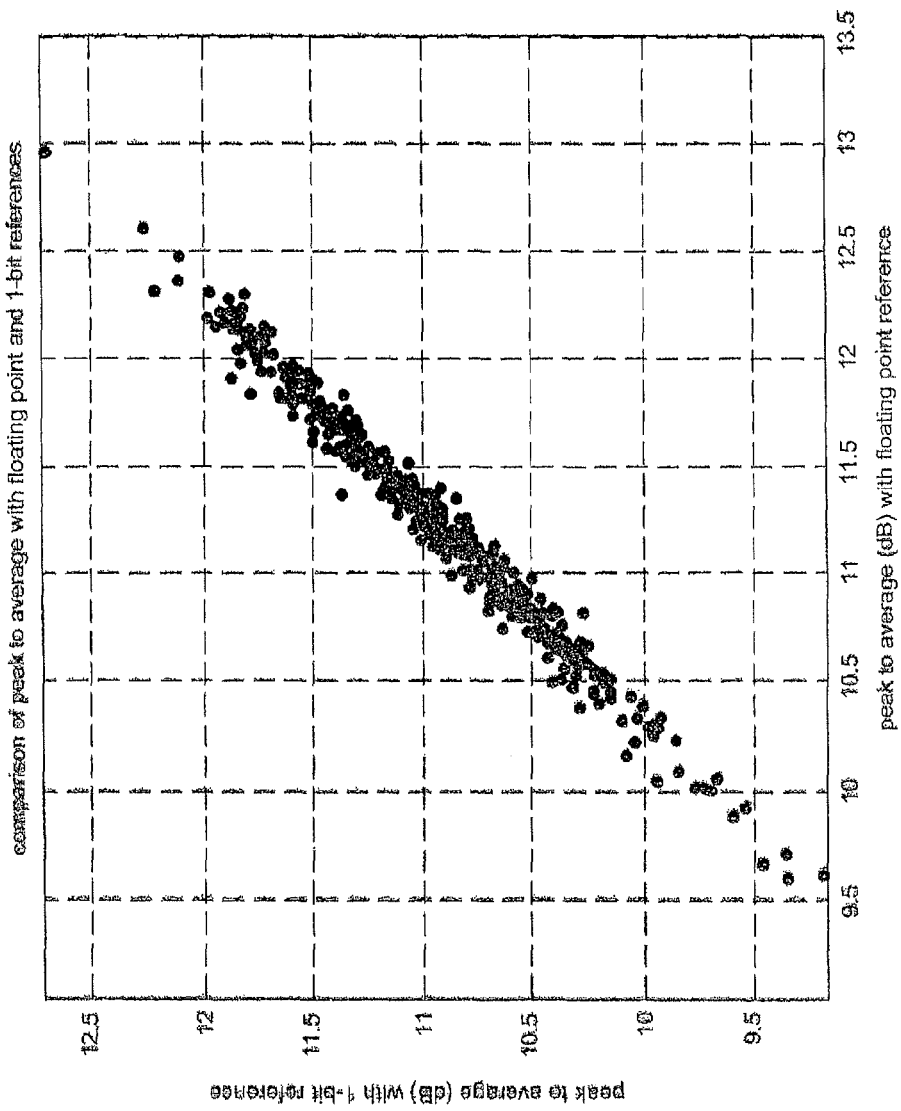
FIG. 10 is a diagram of a peak to average ratio comparison between fixed and floating point references in a simulation.
Figure 11:
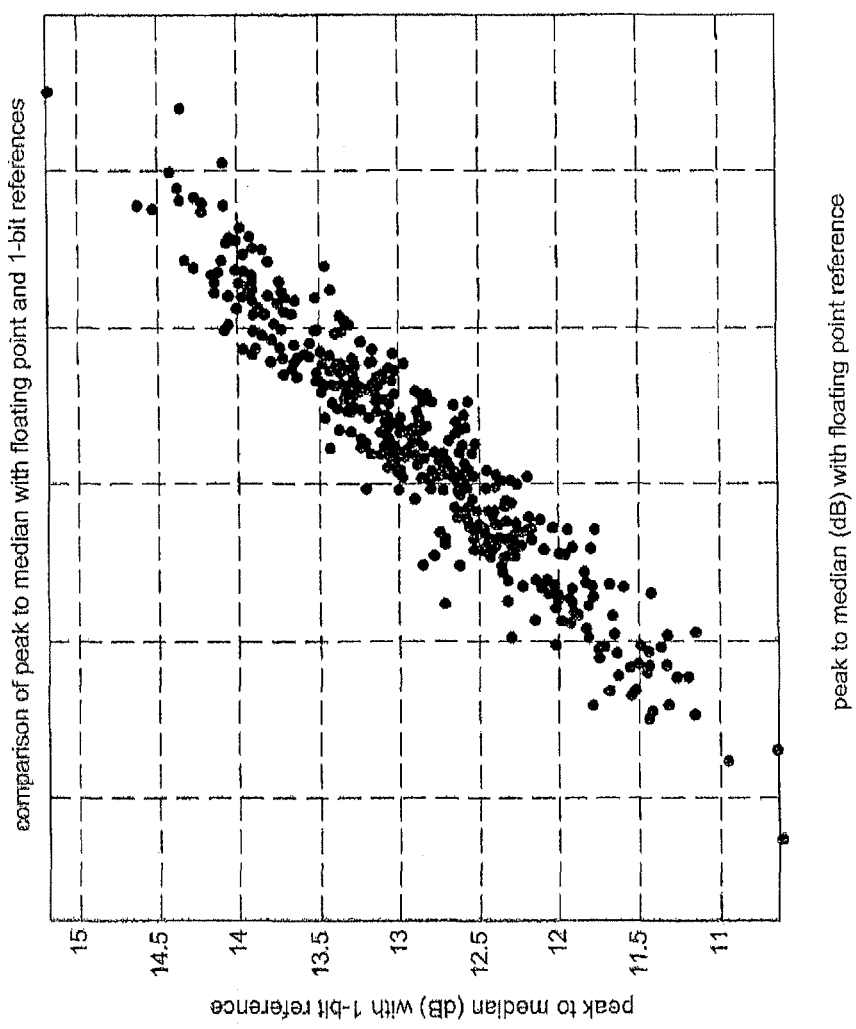
FIG. 11 is a diagram of a peak to median ratio comparison between fixed and floating point references in a simulation.
Figure 12:
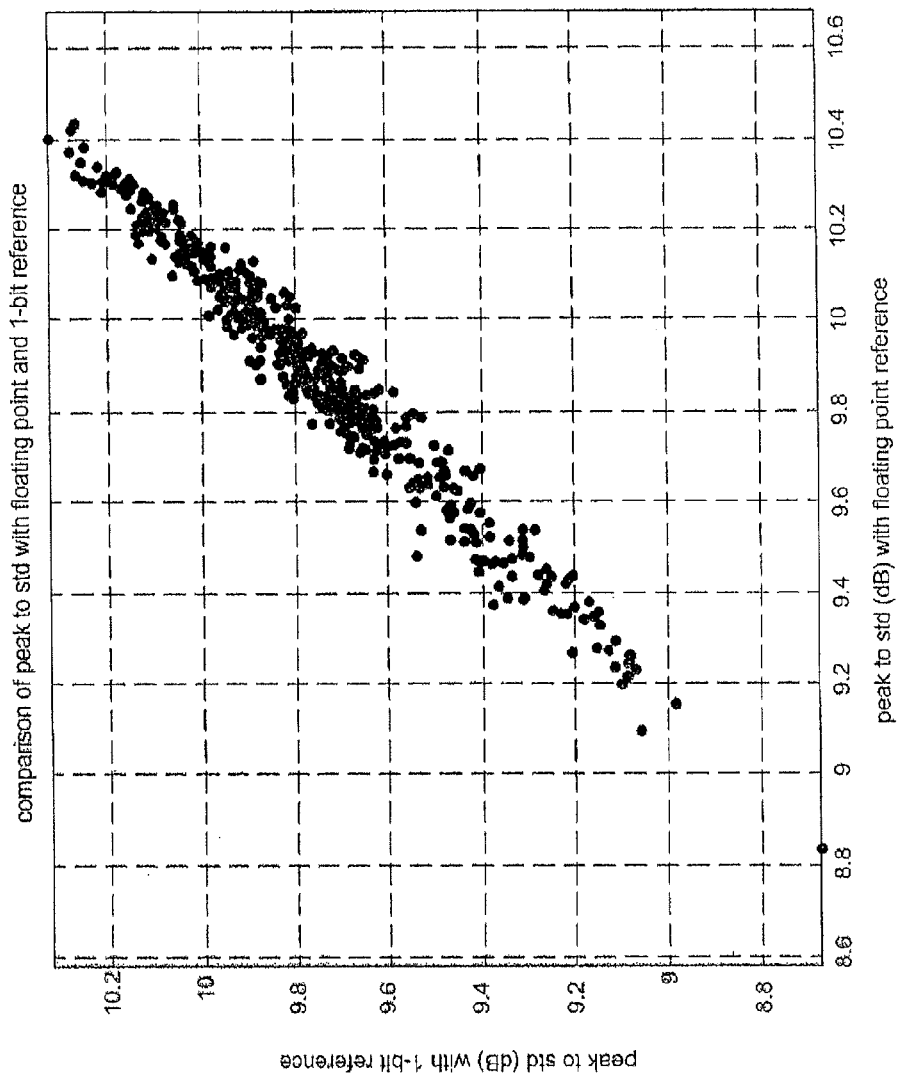
FIG. 12 is a diagram of a peak to standard ratio comparison between fixed and floating point references in a simulation.
Figure 13:
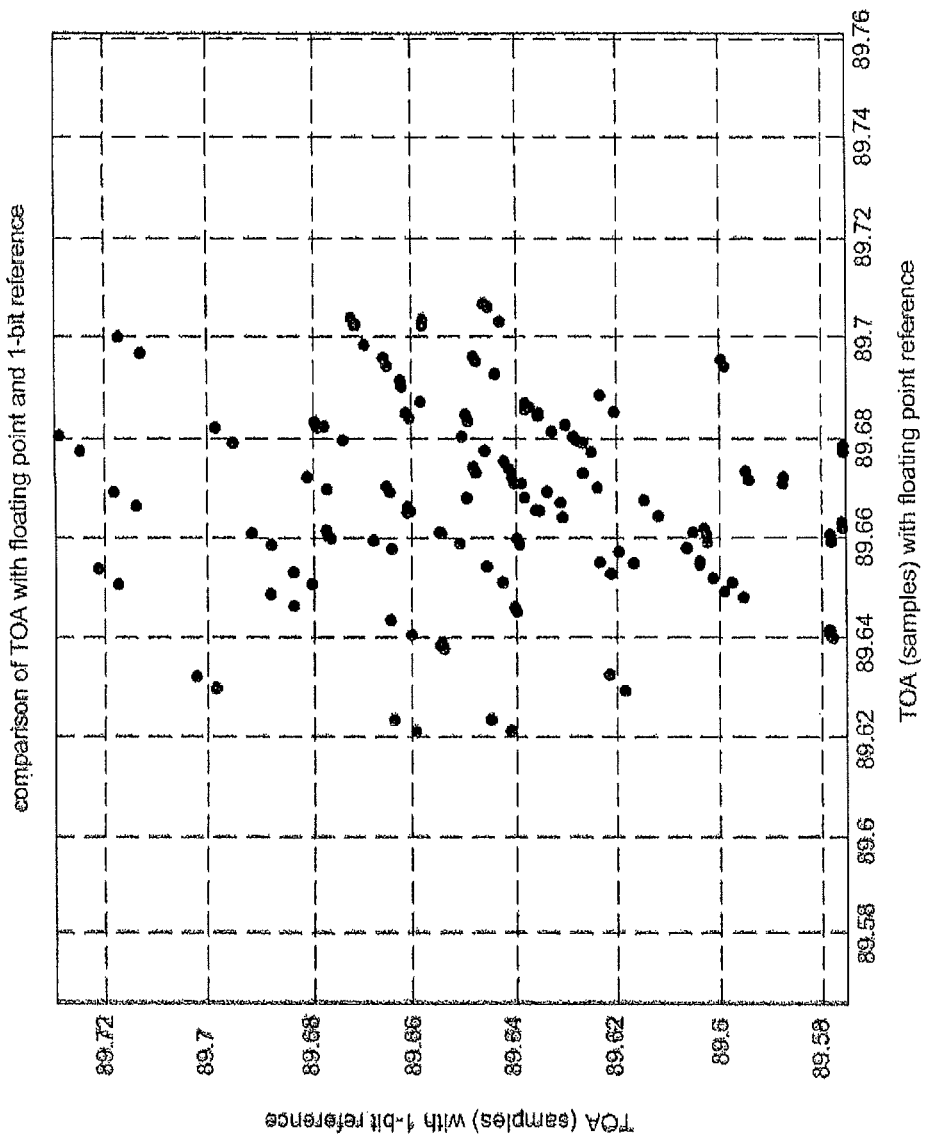
FIG. 13 is a diagram of TOA estimation with a floating point and 1-bit reference.

A simulation was established to quantitatively measure degradation attributable to a fixed point reference. FIG. 10 is a diagram of a peak to average ratio comparison between fixed and floating point references in the simulation, FIG. 11 is a diagram of a peak to median ratio comparison between fixed and floating point references in the simulation, FIG. 12 is a diagram of a peak to standard deviation ratio comparison between fixed and floating point references in the simulation, and FIG. 13 is a diagram of TOA estimation with a floating point and 1-bit reference. With reference to FIGS. 10-12, random bursts were utilized, but the reference signals or training sequences were employed at the same location. That is, the location of the reference signal or training sequence was selected to keep the TOA same for different bursts. In this example, all eight training sequences were utilized in the transmitted bursts and no additional noise added. The received signal was then correlated against fixed and floating point references. Three commonly used detection metrics, peak to average ratio (FIG. 10), peak to median ratio (FIG. 11) and peak to standard deviation ratio (FIG. 12), suffered only about 0.29 dB, 0.35 dB, and 0.13 dB, respectively, when a 1-bit fixed point reference was used instead of a floating point reference. As illustrated in FIGS. 10-12, the peak detection metrics do not suffer much. With reference to FIG. 13, the TOA estimation error appears to degrade with a 1-bit fixed point reference. Standard deviations of the TOA estimation in floating point and 1-bit references are 15.3 and 27.5 meters, respectively. Exemplary CLUs may provide powerful correlation utilities if a 1-bit reference is utilized; the CLU may compute up to 128 complex multiplies and 128 complex additions (accumulations) in a single cycle. As peak detection and TOA estimation performance with a 1-bit reference is comparable to that of a floating point reference, a CLU based correlation technique may be implemented in certain non-limiting embodiments of the present subject matter.

A training sequence may generally be around 17.5% of an entire burst, and correlation gain using the training sequence of one burst may not be adequate for signal detection in secondary sites. An existing GSM system, after demodulation in the primary site, may utilize the whole burst as a reference. To provide comparable performance in an exemplary system, an increase of around 7.55 dB processing gain may be employed. This processing gain may be achieved through non-coherent addition of multiple transmitted slots. For example, approximately ten non-coherent additions may be employed in certain embodiments to increase the processing gain.

Figure 14A:
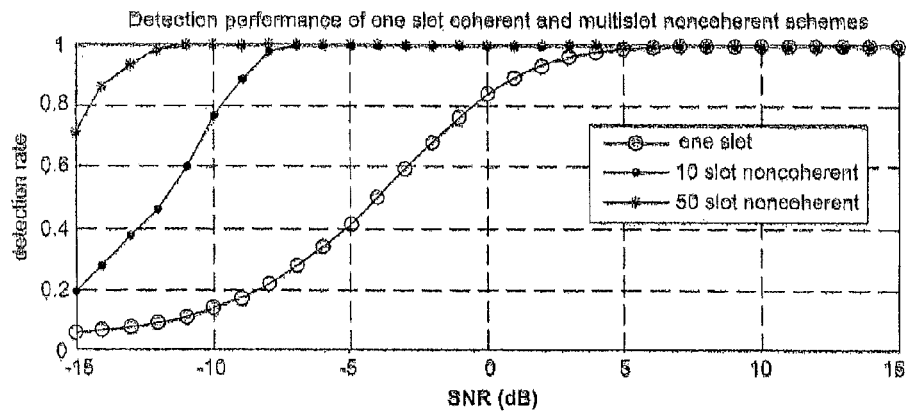
FIGS. 14a-c are diagrams of detection performance of non-coherent addition of an embodiment of the present subject matter.
Figure 14B:
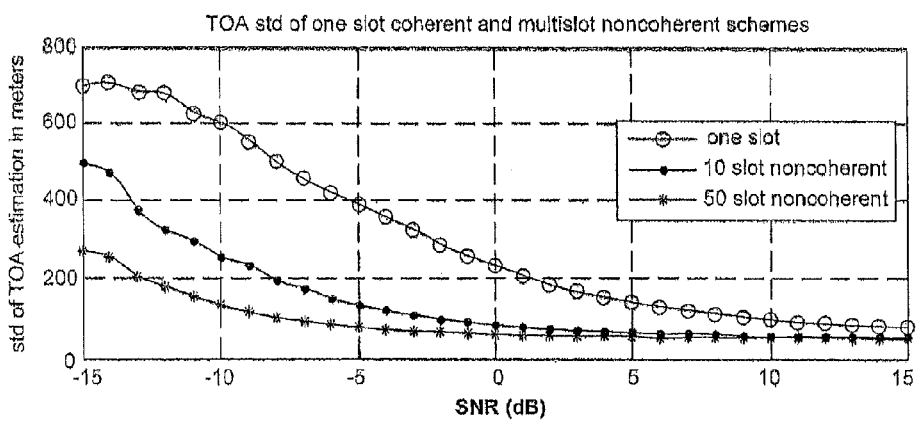
Figure 14C:
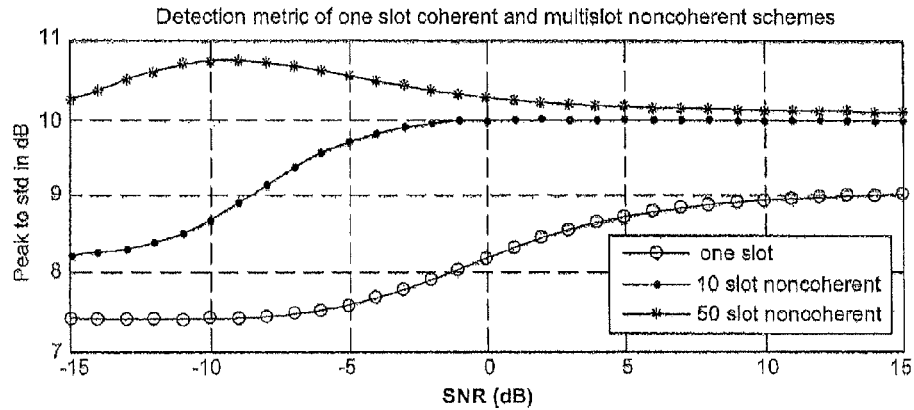

Simulation of another embodiment was employed to verify the effectiveness of ten and fifty slot non-coherent addition schemes. FIGS. 14a-c are diagrams of detection performance of non-coherent addition of an embodiment of the present subject matter. With reference to FIGS. 14a-c, a sampling rate of one GSM channel was selected to be approximately 1300/3=433.333 KHz so that there are 250 samples in a slot. Seven 200 KHz spaced GSM channels having different training sequences were sampled at 5200/3=1733.333 KHz. The channels were provided with equal power and significant ISI existed between channels. As may be observed from FIGS. 14a-c, ten non-coherent additions generally provide adequate processing gain for an embodiment of the present subject matter. Further, it was also observed that both the detection rate and TOA accuracy increased with non-coherent addition of multiple slots. In embodiments requiring alignment of slots for non-coherent addition, the correlation data of different slots may be delayed by fractional samples to align them. A Lagrange interpolation filter having a small number of taps may also be employed for delay adjustment.

As the output of the FFT routines will generally be 32-bit I/Q packed complex numbers, one embodiment may employ an extended precision CLU xcorr instruction for correlation to avoid rearranging data into a 16-bit I/Q packed complex format. An exemplary extended precision instruction may also reduce risk of overflow and underflow and may make scaling easier with fixed point implementation. Further, with an extended precision instruction, eight correlation output values may be available after the correlation operation. Thus, a minimum processing block duration may be eight samples at 400 KHz. Of course, this is exemplary only and should not limit the scope of the claims appended herewith as one of skill in the art would note that any reasonable length of data that is a multiple of eight may be employed.

As discussed above, every thirty two input data points, packed in a 32-bit I/Q complex format, may be windowed by a 32 point real filter or other suitable filter as the first step. In one embodiment, the following assembly instruction may be employed:

$$\{X|Y|XY\}Rs=MRa, MRa+=Rm**Rn\{(\{I\}\{C\}\{J\})\} \qquad (1)$$

With proper options, such as fractional mode and clearing, the above instruction (1) may multiply a complex input with 16-bit (32-bit I/Q packed, with Q part set to zero) real coefficients and may transfer the result into a register in a single cycle; thus, the minimum cycle count for filtering may be 32 cycles. These 32 complex samples may then go through the FFT block and produce 32 output samples, each of which may represent a sample at 400 KHz. In one embodiment utilizing a TigerSHARC processor, the cycle count for fixed point FFT may vary from 2.2 to 3 cycles per tap, and it is estimated that approximately 80 cycles may be necessary for a 32 point FFT in this non-limiting embodiment. Generally, the processes of windowing and FFT computation may be performed eight times to obtain eight output samples per GSM channel; thus, a total cycle count estimate for an eight sample long processing block may be (32+80)*8=896 cycles. With an implementation margin of 5, one realistic cycle count estimate may be 4480 cycles for one channelizer according to an embodiment of the present subject matter.

Correlation and squaring operations for two sequences were implemented in one embodiment at the same time using two (X and Y) compute blocks. In this implementation, it was observed that 62 cycles were utilized to obtain eight correlation output for two sequences, meaning a cycle count of 31 cycles per sequence. Tasks that were accomplished within the 62 cycles included: read 40+8=48 complex input data samples from internal memory buffer; read two pre-computed reference signal (modulated training sequence) from internal memory and load the THR registers; correlate 48 complex input samples with 40 reference samples and obtain 8 correlation output for each of the two sequences; transfer the correlation output from the CLU's TR registers into compute block registers; perform $I^2+Q^2$ operations on the correlation output; and save the 16 values (8 for each sequence) in a buffer in the internal memory so that a DMA process may ship them out to external memory later; to name a few.

In one embodiment each channel should correlate with eight different channel sequences resulting in a total cycle count of 31*8=248 cycles. For every eight new input samples to the correlator, there should be eight output sequences, each having eight samples. The outputs are 32-bit integers and generally require four bytes to store. The duration of the eight output samples equates to 8/400e3=2e-5 seconds. Therefore, memory required per channel per second equates to 8*8*4/2e-5=1.28e7 bytes or 12.8 MB. Of course, this implementation is exemplary only and should not limit the scope of the claims appended herewith.

Figure 15:
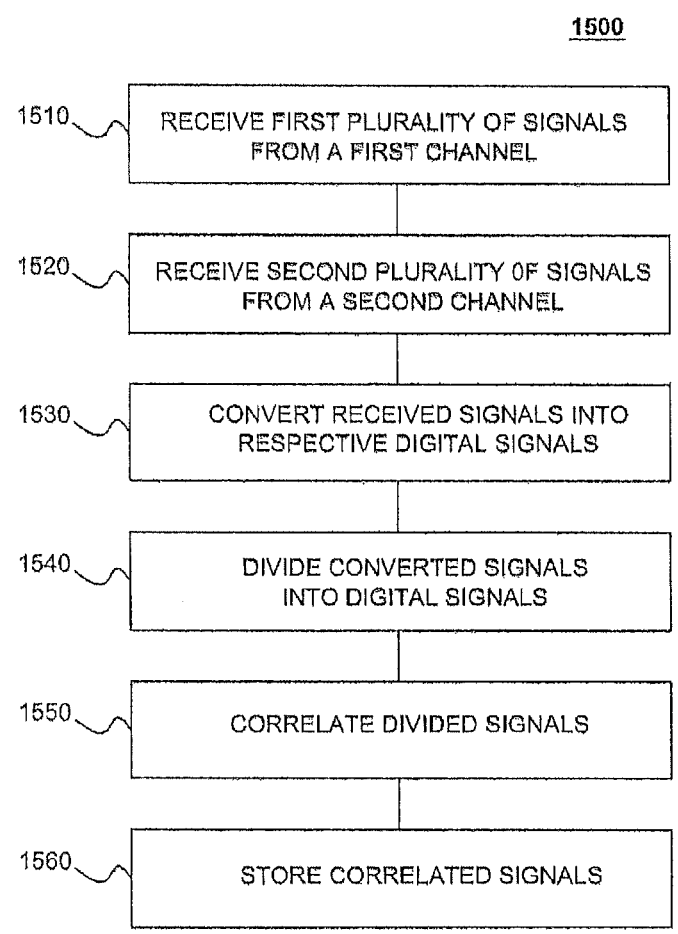

FIG. 15 is a block diagram of an algorithm according to one embodiment of the present subject matter. With reference to FIG. 15, a method 1500 for estimating a location of wireless devices transmitting signals on channels in a communications system having a plurality of nodes and a plurality of LMUs is provided. At step 1510, a first plurality of signals may be received from a first channel by one or more of the plural LMUs, and at step 1520, a second plurality of signals may be received from a second channel by one or more of the plural LMUs. The received first and second plural signals may be converted into first and second digital signals at step 1530, and at step 1540 divided into first and second sets of frequency bins, the first and second sets of bins corresponding to the respective channel. In one embodiment the step of dividing may further comprise windowing the first and second digital signals and determining an IFFT of each of the windowed signals. This windowing may be performed by a 32-tap FIR filter and these additional steps may be performed in parallel or in series.

At step 1550, each of the divided signals may be correlated with one or more reference signals, such as, but not limited to, training sequences. In one embodiment, this correlation may be a continuous correlation with eight training sequences. The correlated signals may then be stored at step 1560 in a database for estimating a location of one or more wireless devices. In another embodiment, the method may include estimating a location of the wireless device as a function of the stored correlated signals. One embodiment may include receiving tipping information by one or more of the LMUs wherein data used for the stored correlated signals was received prior to receipt of the tipping information. Exemplary tipping information may be, but is not limited to, frequencies or channel numbers of transmissions from the wireless device, approximate time of one or more transmissions from the wireless device, training sequences utilized in one or more transmissions from the wireless device, and combinations thereof. Another embodiment may locate the wireless device after it has ceased transmitting signals on its respective channel and when the step of estimating a location occurs after the cease of transmission. An additional embodiment may include the steps of receiving tipping information by one or more of the LMUs, retrieving stored correlated signals from the database matching data in the tipping information, non-coherently adding the retrieved signals, determining TOA information as a function of peak or peak quality of the added signals, and estimating a location of a wireless device as a function of the determined TOA information.

FIG. 16 is a block diagram of an algorithm according to another embodiment of the present subject matter. With reference to FIG. 16, a method 1600 for estimating a location of a wireless device in a communication system having a plurality of nodes and a plurality of LMUs is provided. At step 1610 tipping information corresponding to the wireless device may be received by ones of the plural LMUs. At step 1620, the wireless device may be located as a function of signals transmitted from the wireless device prior to receipt of the tipping information. In another embodiment, step 1620 may further include converting transmitted signals from the wireless device into digital signals, dividing the digital signals into a set of frequency bins corresponding to a channel upon which the wireless device transmitted, correlating the divided signals with one or more training sequences, and storing correlated signals in a database for use in the location of the wireless device.

FIG. 17 is a block diagram of an algorithm according to a further embodiment of the present subject matter. With reference to FIG. 17, a method 1700 for estimating a location of a wireless device transmitting signals on a channel in a communication system having a plurality of nodes and a plurality of LMUs is provided. At step 1710, tipping information may be received by ones of the plural LMUs, the tipping information corresponding to the wireless device. At step 1720, a location of the wireless device may be determined as a function of the tipping information when the device is no longer transmitting signals. In another embodiment of the present subject matter, step 1720 may further include converting transmitted signals from the wireless device into digital signals, dividing the digital signals into a set of frequency bins corresponding to a channel upon which the wireless device transmitted, correlating the divided signals with one or more training sequences, and storing correlated signals in a database for use in the location of the wireless device. A further embodiment may include the steps of retrieving stored signals from a database that match data in the tipping information with the wireless device, non-coherently adding the retrieved signals, determining TOA information as a function of peak or peak quality of the added signals, and determining a location of a wireless device as a function of the determined TOA information.

FIGS. 15-17 illustrate high-level logic flow diagrams for exemplary process steps for implementing the method and system of the present subject matter. These steps are those requiring a physical manipulation of physical quantities. Usually, although not necessarily, these quantities take the form of electrical or magnetic signals capable of being stored, transmitted, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "receiving," "transmitting," "determining," "storing," and the like, may commonly be associated with mental or physical operations performed by a human operator; however, no such capability of a human operator is possible or desirable in most cases of the operations described herein. As indicated herein, these operations are primarily machine operations. Useful machines for performing operations of a preferred embodiment of the present subject matter include data-processing systems. The present subject matter relating to method steps for processing electrical or other physical signals to generate other desired signals can generally be implemented via a computer or microcomputer. However, it is not necessary to maintain within a computer memory of a mobile telephone subscriber unit, instructions implementing these method steps. Such instructions can be maintained within a computer memory location of a wireless telephone base station or at a central center from which such base stations receive instructions.

It can be appreciated by those skilled in the art that the methods described herein can be implemented as a program product (e.g., a control program residing in a computer memory) containing instructions that when executed on a processor, carry out the operations depicted in the logic diagrams of FIGS. 15-17. While the present subject matter is described in the context of a fully functional system, those skilled in the art will further appreciate that the present subject matter is capable of being distributed as a program product in a variety of forms, and that the present subject matter applies equally, regardless of the particular type of signal-bearing media utilized to actually carry out the distribution. Examples of signal-bearing media include recordable-type media, such as floppy disks, hard-disk drives and CD ROMs, and transmission-type media, such as digital and analog communication links.

As shown by the various configurations and embodiments illustrated in FIGS. 1-17, a system and method for a high throughput GSM location solution have thus been described.

The embodiments and examples set forth herein are presented to best explain the present subject matter and its practical application and to thereby enable those skilled in the art to make and utilize the present subject matter. However, those skilled in the art will recognize that the foregoing description and examples have been presented for the purpose of illustration and example only. For example, although the present subject matter has been described herein within the context of a GSM wireless telecommunications network, the present subject matter may be implemented in any of a number of different communications systems. In addition, a variety of geographical positioning methods may be utilized in accordance with the present subject matter described and claimed herein. Thus, while preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for estimating a location of wireless devices transmitting signals on channels in a communications system having a plurality of nodes and a plurality of Location Measurement Units ("LMU") comprising the steps of:
    (a) receiving a first plurality of signals from a first channel by one or more of the plural LMUs;
    (b) receiving a second plurality of signal from a second channel by one or more of the plural LMUs;
    (c) converting the received first and second plural signals into first and second digital signals;
    (d) dividing the first and second digital signals into first and second sets of frequency bins, the first and second sets of bins corresponding to the respective channel;
    (e) correlating each of the divided signals with one or more reference signals;
    (f) storing correlated signals in a database for estimating a location of one or more wireless devices;
    (g) receiving tipping information by one or more of the LMUs wherein data used for the stored correlated signals was received prior to receipt of the tipper information; and
    (h) estimating a location of the wireless device as a function of the stored correlated signals.

2. The method of claim 1 wherein the one or more reference signals is one or more training sequences or any known reference signals.

3. The method of claim 1 wherein the step of dividing further comprises:
    (i) windowing the first and second digital signals; and
    (ii) determining an inverse fast Fourier transform ("IFFT") of each of the windowed signals.

4. The method of claim 3 wherein the windowing is performed by a finite impulse response ("FIR") filter.

5. The method of claim 3 wherein the steps of windowing of the first and second digital signals and determining are performed in parallel.

6. The method of claim 3 wherein the steps of windowing of the first and second digital signals and determining are performed in series.

7. The method of claim 1 wherein the tipping information is selected from the group consisting of: frequencies or channel numbers of transmissions from the wireless device, approximate time of one or more transmissions from the wireless device, training sequences utilized in one or more transmissions from the wireless device, and combinations thereof.

8. The method of claim 1 wherein the wireless device has ceased transmitting signals on its respective channel and the step of estimating a location occurs after the cease of transmission.

9. The method of claim 1 wherein the step of correlating further comprises continuously correlating each of the divided signals with eight training sequences.

10. The method of claim 1 wherein the first and second digital signals are divided serially.

11. The method of claim 1 wherein the first and second digital signals are divided in parallel.

12. In a method for estimating a location of a wireless device transmitting signals on a channel in a communication system having a plurality of nodes and a plurality of Location Measurement Units ("LMU"), wherein tipping information corresponding to the wireless device is received by ones of the plural LMUs, the improvement comprising determining a location of the wireless device as a function of the tipping information when the device is no longer transmitting signals, retrieving stored signals from a database that match data in the tipping information with the wireless device, non-coherently adding the retrieved signals, determining time of arrival ("TOA") information as a function of peak or peak quality of the added signals, and determining a location of a wireless device as a function of the determined TOA information.

13. The method of claim 12 wherein the step of locating the wireless device further comprises:
    (i) converting transmitted signals from the wireless device into digital signals;

(ii) dividing the digital signals into a set of frequency bins corresponding to a channel upon which the wireless device transmitted;
(iii) correlating the divided signals with one or more reference signals; and
(iv) storing correlated signals in a database for use in the location of the wireless device.

* * * * *